J. BADEKER.
METALLIC ROD PACKING.
APPLICATION FILED NOV. 12, 1917.

1,338,206.

Patented Apr. 27, 1920.

Inventor.
JOHN BADEKER,

Witness:
A.W. Jamieson.

By David O. Barnell.
Attorney.

UNITED STATES PATENT OFFICE.

JOHN BADEKER, OF OMAHA, NEBRASKA, ASSIGNOR TO CHICAGO STANDARD METALLIC PACKING COMPANY, OF OMAHA, NEBRASKA, A CORPORATION OF NEBRASKA.

METALLIC ROD-PACKING.

1,338,206.  Specification of Letters Patent.  Patented Apr. 27, 1920.

Application filed November 12, 1917. Serial No. 201,693.

*To all whom it may concern:*

Be it known that I, JOHN BADEKER, a citizen of the United States, and a resident of Omaha, in the county of Douglas and State of Nebraska, have invented certain new and useful Improvements in Metallic Rod-Packings, of which the following is a specification.

My invention relates to metallic rod-packing for use on cylindrical reciprocating rods such as the piston-rods and valve-rods of steam engines, pumps, air and gas compressors and the like. It is the object of my invention to provide a metallic rod-packing in which the parts or segments of the packing-ring are of such form that the ring may close or expand to accommodate wear of the packing or variation in the size of the rod, without bending or deformation of the segments in any way. A further object of my invention is to provide a packing-ring of which the segments are so formed that they are automatically retained in uniformly spaced relation to each other circumferentially of the rod, and which have no tendency to separate or open the fluid-tight joints between them. A further object of my invention is to provide a packing-ring consisting of segments of such form that all surfaces thereof may be finished by ordinary machining operations, thus enabling the packing to be made of any suitable metal, and not restricting the construction thereof to the use of metals which may be cast in special molds with surfaces smooth enough to form fluid-tight joints without machining. A further object of my invention is to provide in a metallic packing means for preventing dropping of the segments away from the rod should the annular closing-springs about the packing-ring be broken.

Figure 1:
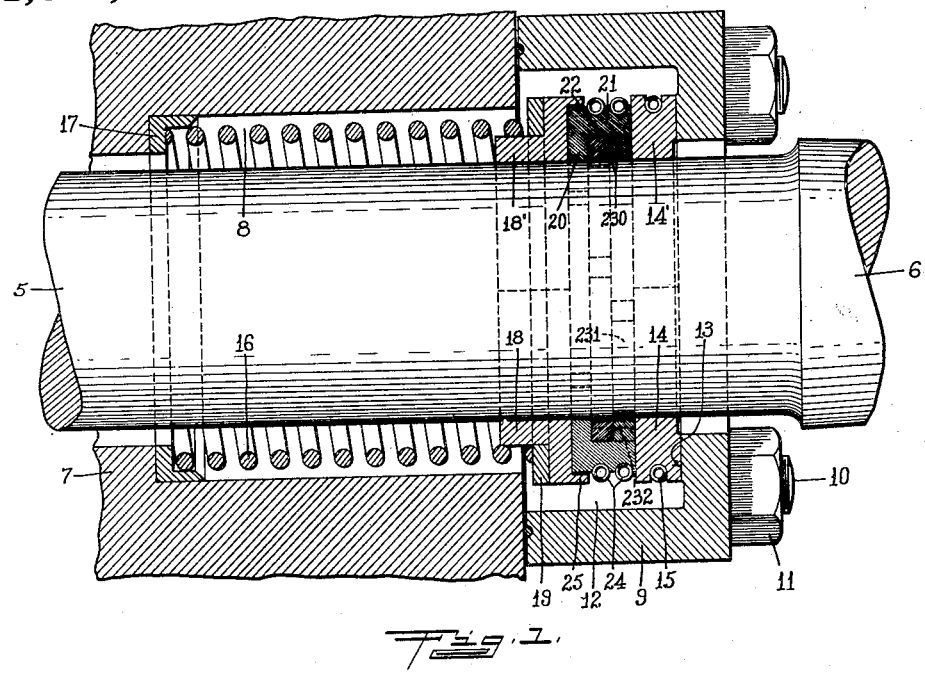
Figures 2, 3, 4:
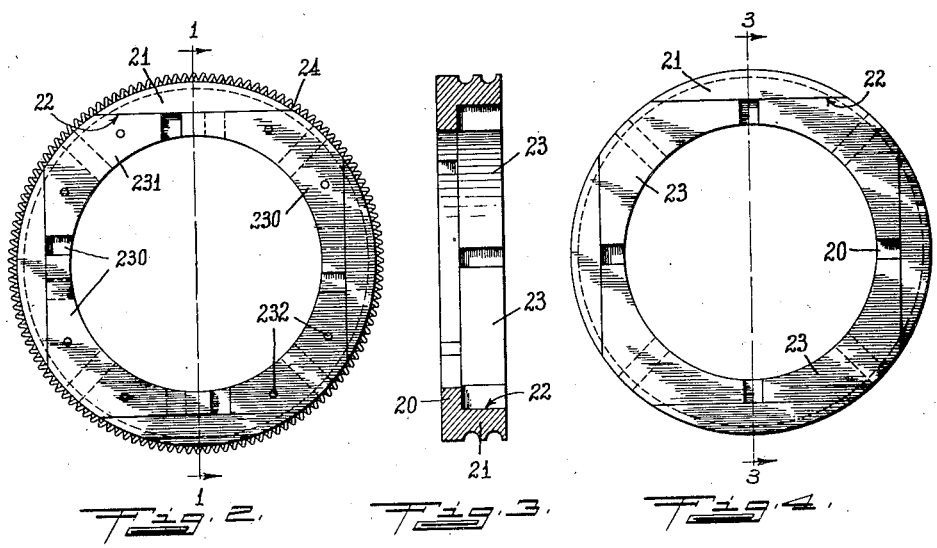

In the accompanying drawings, Figure 1 is a longitudinal or axial section of a packing embodying my invention, together with associated parts, Fig. 2 is a front view of the packing-ring, Fig. 3 is an axial section of a slightly modified form of the packing-ring, and Fig. 4 is a front view of the same.

In the structure shown in Fig. 1 there is indicated a portion of a rod 5, such as the piston-rod of an engine or pump, the rod having the usual enlargement 6 at the end thereof which is connected with the crosshead. There is also indicated a portion of a cylinder-head 7 having a stuffing-box 8 through which the rod passes. A gland 9 is secured to the cylinder-head over the front or open end of the stuffing-box, by means of stud-bolts 10 and nuts 11 in the usual manner, the gland inclosing peripherally and partially closing the end of an annular packing-chamber 12. Within said chamber 12, and fitting slidably against the inner face 13 of the gland, there is disposed a split stop-ring comprising two semi-annular parts 14—14' held together by an annular coil spring 15 disposed in a peripheral groove in the ring, as shown. The abutting ends of the two parts of the ring lie in a plane intersecting longitudinally the axis of the rod, said ends forming fluid-tight joints with each other, and the front side of the ring forming a fluid-tight joint with the inner face 13 of the gland. The stop-ring does not form a fluid-tight joint with the rod, however, being incapable of closing upon the rod to compensate wear, but the packing-ring disposed behind the stop-ring forms fluid-tight joints with both the rod and the rear side of the stop-ring, and thus prevents escape of fluid from the cylinder through the gland and around the rod. The packing-ring is pressed against the stop-ring by means of a follower-spring 16 which encircles the rod, extending back into the stuffing-box 8, the rear end of the spring engaging a neck-ring 17 at the end of the stuffing-box, and the front end of the spring engaging a follower. The follower, which directly engages the rear side of the packing-ring, comprises an inner split angle-ring consisting of two parts 18—18', and a continuous ring 19 which fits over the axial flange of the angle-ring to hold the two parts thereof together. The bore of the angle-ring is such as to fit loosely upon the rod, and in some instances the ring 19 may be omitted, in which case the two parts of the angle-ring are held together by the encircling coils of the spring 16 upon the axial flange of the ring. It may be noted that the stop-ring and angle-ring are split to enable assembly thereof upon a rod having the end-enlargement 6, since the continuous annular parts, such as the gland, ring 19, spring 16 and neck-ring 17, must each have a large enough bore to enable them to pass over said enlarged end of the rod when assembling or dismounting the parts.

Referring now to the packing-ring, the same has a plurality of annularly disposed main segments, each of the same form and consisting of a body-portion 20 and a flange-portion 21. Said body-portions 20 are rectangular in axial section, the front and rear surfaces thereof being perpendicular to the rod, the concave inner surfaces fitting upon the rod, and the outer or convex surfaces being concentric therewith. The outer sides of the flange-portions 21 are arcuate and conform with the outer sides of the body-portions, the inner sides of the flange-portions are chordal plane-surfaces 22 extending parallel to the rod-axis, and the front sides of the flange-portions are perpendicular to the rod and engage the rear side of the stop-ring when the packing is in assembled and operative position. The adjacent ends of the several body-portions 20 are parallel to each other, being approximately radial to the rod and uniformly separated from each other to provide clearance-spaces which are gradually reduced in width as the ring wears and closes upon the rod. The flange-portions 21 are symmetrical to the body-portions and shorter than the same, so that the flanges terminate in sharp edges at the periphery and near the ends of the body-portions.

In the structure shown in Figs. 3 and 4, there are inner segments 23, the same in number as the main segments, said inner segments being rectangular in axial section and having inner concave surfaces which fit upon the rod. The rear sides of said inner segments fit against the front sides of the body-portions of the main segments, and the front sides of said inner segments fit against the stop-ring, the thickness or dimension of said segments longitudinally of the rod being the same as that of the flange-portions 21 of the main segments. The adjacent ends of the several inner segments are parallel to each other, and separated to form clearance-spaces between them of the same width as the clearance-spaces between the ends of the body-portions of the main segments. The clearance-spaces of the two sets of segments alternate circumferentially of the ring, so that the spaces between the ends of the main segments are stopped longitudinally of the rod by the inner segments, the spaces between the ends of the inner segments are stopped longitudinally of the rod by the body-portions of the main segments, and said latter spaces are stopped radially of the rod by the flange-portions 21 of the main segments. Adjoining the ends of each inner segment there are plane-surfaced outer faces which extend angularly to each other and fit slidably against the adjacent portions of the chordal inner surfaces 22 on the flanges 21 of a pair of the main segments. Intermediate the flat or plane-surfaced outer sides of each segment 23 there is an arcuate surface coincident circumferentially with the outer surfaces of the main segments. The peripheral portions of the segments are grooved to receive annular closing springs 24 which are under such tension as to press the segments in toward the rod and retain them radially thereof. To prevent the segments falling away from the rod into the lower part of the packing-chamber, should the closing-springs 24 be broken while the packing is in use, the follower angle-ring 18—18' is provided with a peripheral flange 25 which extends forwardly over the rear portion of the packing-ring, as shown in Fig. 1.

In that form of the packing-ring shown in Figs. 1 and 2, the inner segments each consist of two pieces 230 and 231 which are secured to each other by pins 232. The pieces 230 are of greater length than the pieces 231, but both pieces are of the same thickness or dimension axially of the rod, and the longer pieces 230 are placed alternately at the front and rear sides of the segments, so that the ends thereof overlap each other when in the assembled position, as shown clearly in Fig. 2. The inner segments occupy the same positions within the main segments as the one-piece inner segments first described, and may be considered as of the same general form but with extended overlapping end-portions. The ends of the two-piece inner segments have, of course, the usual clearance-spaces to enable closure of the packing-ring as the rod-engaging surfaces thereof are worn away.

It will be seen from the foregoing that the engaging surfaces of the main and inner segments of the packing-ring are freely slidable upon each other without altering the uniformity of spacing of the several segments about the rod, the engagement of the segments at the chordal surfaces 22 insuring the continued uniformity of the clearance-spaces as the ring closes. It will also be seen that the closure of the ring involves no bending or deformation of the segments, and that as each segment engages but a comparatively short arc of the rod-surface, the wear of the rod-engaging surface of each segment will be substantially uniform throughout. It will also be seen that on rods, such as the valve-rods of locomotives, which have a variable travel and consequently wear hollow at the central part of the portion thereof passing through the packing, the described packing-ring may be used effectively, since the structure thereof is such that it may readily expand as well as contract to accommodate the slight variations in diameter of different longitudinal portions of the rod. It will be noted further that all of the segments of the packing-ring are of simple geometrical form, such that all the surfaces thereof may be readily finished by ordinary machining operations, such as turning and planing or flat milling, thus enabling the use in the packing of any suitable metal, or even the use of various non-metallic materials, regardless as to whether the material may be molded or cast to the exact required form.

Now, having described my invention, what I claim and desire to secure by Letters Patent is:

1. In a metallic rod-packing, a packing-ring disposed about the rod, annular closing springs encircling said packing-ring, a follower disposed at one side of said packing-ring, means for pressing the follower axially of the rod toward the packing-ring, and a continuous annular peripheral flange on the follower extending partly over the peripheral portion of the packing-ring at one side of the portion encircled by the closing springs, for the purpose described.

2. In a metallic rod-packing, a packing-ring comprising a plurality of main segments disposed annularly about the rod, a like number of inner segments each lapping the adjacent ends of two of the main segments, each main segment having a flange-portion extending over the adjacent end-portions of two of the inner segments, said flange-portion having a chordal inner surface fitting slidably upon alined plane-surfaced peripheral faces of the two inner segments, and means for closing the segments upon the rod.

3. In a metallic rod-packing, a packing-ring comprising an annularly disposed series of segments fitting upon the rod, the adjacent ends of said segments having alined plane-surfaced outer sides, a second series of segments fitting upon the rod and against one side of the first series, the ends of the two series of segments alternating circumferentially of the rod, the second series of segments each having a flange-portion extending over the ends of the adjacent pair of the first segments, said flange-portion having a single plane-surfaced inner face fitting upon the outer sides of said first segments, and resilient means for pressing the segments toward the rod.

4. In a metallic rod-packing, a packing-ring comprising an annular series of segments having chordally undercut peripheral portions, and a second series of annularly disposed segments arranged within said chordally undercut portions of the first series and having plane-surfaced faces slidably engaging the same, there being circumferential clearance-spaces between the adjacent ends of each of the series of segments, said clearance-spaces alternating circumferentially of the ring, and means for pressing the segments together longitudinally and radially of the rod.

5. In a metallic rod-packing, a packing-ring comprising an annular series of main segments having body-portions of rectangular axial section with clearance-spaces between adjacent ends thereof, a second annular series of segments fitting against one side of the main segments and having clearance-spaces arranged circumferentially intermediate the clearance-spaces of the main segments, the adjacent ends of each pair of the second series of segments having alined plane-surfaced outer sides, and flanges integral with the main segments extending over said end-portions of the second series of segments, said flanges having chordal inner faces engaging said plane-surfaced outer sides of the latter segments.

JOHN BADEKER.